(12) United States Patent
Starkweather et al.

(10) Patent No.: US 7,151,627 B2
(45) Date of Patent: *Dec. 19, 2006

(54) MICROELECTRICAL MECHANICAL STRUCTURE (MEMS) OPTICAL MODULATOR AND OPTICAL DISPLAY SYSTEM

(75) Inventors: Gary K Starkweather, Bellevue, WA (US); Michael J Sinclair, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 36 days.

This patent is subject to a terminal disclaimer.

(21) Appl. No.: 10/872,741

(22) Filed: Jun. 21, 2004

(65) Prior Publication Data

US 2005/0002086 A1 Jan. 6, 2005

Related U.S. Application Data

(63) Continuation of application No. 09/702,585, filed on Oct. 31, 2000, now Pat. No. 6,775,048.

(51) Int. Cl.
*G02B 26/00* (2006.01)
(52) U.S. Cl. ..................................... 359/291
(58) Field of Classification Search ............... 359/290, 359/291, 292, 223, 224, 230, 288, 302, 621, 359/622, 623
See application file for complete search history.

(56) References Cited

U.S. PATENT DOCUMENTS

| | | | |
|---|---|---|---|
| 3,071,036 A | 1/1963 | McKnight et al. ............ 88/1 |
| 4,157,861 A | 6/1979 | Davies ..................... 350/285 |
| 4,421,381 A | 12/1983 | Ueda et al. ................. 350/6.6 |
| 5,061,914 A | 10/1991 | Busch et al. ............... 337/140 |
| 5,062,689 A * | 11/1991 | Koehler .................... 359/230 |
| 5,084,044 A | 1/1992 | Quint |

(Continued)

FOREIGN PATENT DOCUMENTS

EP 0 774 681 A1 5/1997

(Continued)

OTHER PUBLICATIONS

Chiao, M. et al., "Self-Buckling of Micromachined Beams Under Resistive Heating", *Journal of Microelectomechanical Systems*, Mar. 2000, 9(1), 1057-7157.

(Continued)

*Primary Examiner*—Hung Xuan Dang
*Assistant Examiner*—Tuyen Tra
(74) *Attorney, Agent, or Firm*—Woodcock Washburn LLP (57) ABSTRACT

A MEMS optical display system includes an illumination source for providing illumination light, a collimating lens for receiving the illumination light and forming from it collimated illumination light, and a converging microlens array having an array of lenslets that converge the collimated illumination light. The converging microlens array directs the illumination light to a microelectrical mechanical system (MEMS) optical modulator. The MEMS optical modulator includes, for example, a planar substrate through which multiple pixel apertures extend and multiple MEMS actuators that support and selectively position MEMS shutters over the apertures. A MEMS actuator and MEMS shutter, together with a corresponding aperture, correspond to pixel. The light from the converging microlens array is focused through the apertures and is selectively modulated according to the positioning of the MEMS shutters by the MEMS actuators, thereby to impart image information on the illumination light. The light is then passed to a diffused transmissive display screen by a projection microlens array.

13 Claims, 8 Drawing Sheets

U.S. PATENT DOCUMENTS

| | | | |
|---|---|---|---|
| 5,099,352 A | 3/1992 | Yamamoto et al. | 359/213 |
| 5,257,977 A | 11/1993 | Eshel | |
| 5,276,545 A | 1/1994 | Daun et al. | 359/198 |
| 5,392,140 A | 2/1995 | Ezra et al. | 359/41 |
| 5,455,706 A | 10/1995 | Brotz | 359/198 |
| 5,469,291 A | 11/1995 | Plesko | 359/224 |
| 5,481,396 A | 1/1996 | Ji et al. | 359/295 |
| 5,496,271 A | 3/1996 | Burton et al. | |
| 5,504,629 A | 4/1996 | Lim | 359/850 |
| 5,543,956 A | 8/1996 | Nakagawa et al. | 359/225 |
| 5,549,557 A | 8/1996 | Steinke et al. | |
| 5,612,736 A | 3/1997 | Vogeley et al. | 348/207.99 |
| 5,619,177 A | 4/1997 | Johnson et al. | 337/140 |
| 5,666,226 A | 9/1997 | Ezra et al. | 359/621 |
| 5,671,083 A | 9/1997 | Conner et al. | 359/291 |
| 5,688,239 A | 11/1997 | Walker | |
| 5,700,897 A | 12/1997 | Klainer et al. | |
| 5,748,172 A | 5/1998 | Song et al. | 345/111 |
| 5,781,331 A * | 7/1998 | Carr et al. | 359/288 |
| 5,784,189 A | 7/1998 | Bozler et al. | 359/254 |
| 5,870,007 A | 2/1999 | Carr et al. | 333/262 |
| 5,969,710 A | 10/1999 | Doherty et al. | 345/148 |
| 5,994,816 A | 11/1999 | Dhuler et al. | 310/307 |
| 6,023,121 A | 2/2000 | Dhuler et al. | 310/307 |
| 6,046,840 A | 4/2000 | Huibers | 359/291 |
| 6,108,118 A | 8/2000 | Minamoto | 359/224 |
| 6,122,089 A | 9/2000 | Minamoto et al. | 359/198 |
| 6,130,464 A | 10/2000 | Carr | 257/417 |
| 6,137,623 A | 10/2000 | Roberson et al. | 359/291 |
| 6,188,504 B1 | 2/2001 | Murakami et al. | 359/224 |
| 6,220,730 B1 | 4/2001 | Hewlett et al. | 362/297 |
| 6,229,684 B1 | 5/2001 | Cowen et al. | 361/278 |
| 6,236,491 B1 | 5/2001 | Goodwin-Johansson | 359/291 |
| 6,246,504 B1 | 6/2001 | Hagelin et al. | 359/198 |
| 6,249,370 B1 | 6/2001 | Takeuchi et al. | 359/291 |
| 6,259,548 B1 | 7/2001 | Tsugai et al. | 359/224 |
| 6,275,325 B1 | 8/2001 | Sinclair | 359/290 |
| 6,333,583 B1 | 12/2001 | Mahadevan et al. | 310/306 |
| 6,367,251 B1 | 4/2002 | Wood | 60/528 |
| 6,422,011 B1 | 7/2002 | Sinclair | 60/528 |
| 6,438,954 B1 | 8/2002 | Goetz et al. | 60/527 |
| 6,531,947 B1 | 3/2003 | Weaver et al. | 337/139 |
| 6,535,311 B1 | 3/2003 | Lindquist | 359/128 |
| 6,567,295 B1 | 5/2003 | Taussig et al. | 365/105 |
| 6,587,612 B1 | 7/2003 | Mitchell et al. | 385/18 |
| 6,672,724 B1 | 1/2004 | Peterson et al. | 353/81 |
| 6,708,491 B1 * | 3/2004 | Weaver et al. | 60/527 |
| 6,708,492 B1 | 3/2004 | Sinclair | 60/527 |
| 6,785,039 B1 | 8/2004 | Wendland, Jr. | 359/290 |
| 6,804,959 B1 | 10/2004 | Sinclair | 60/527 |
| 6,967,761 B1 * | 11/2005 | Starkweather et al. | 359/291 |
| 2001/0003798 A1 | 6/2001 | McGovern et al. | |
| 2002/0165521 A1 | 11/2002 | Cioanta et al. | |
| 2003/0164814 A1 | 9/2003 | Starkweather et al. | 345/102 |
| 2004/0218292 A1 | 11/2004 | Huibers | 359/850 |

FOREIGN PATENT DOCUMENTS

| | | |
|---|---|---|
| EP | 0 831 252 A2 | 3/1998 |
| EP | 0 778 657 B1 | 9/2001 |
| EP | 1 201 602 A2 | 5/2002 |
| EP | 1 289 273 A1 | 3/2003 |
| EP | 0 692 729 B1 | 4/2003 |
| EP | 1 341 025 A1 | 9/2003 |
| EP | 1 143 467 B1 | 9/2004 |
| FR | 2 703 475 | 10/1994 |
| FR | 2 749 693 | 12/1997 |
| JP | 10-39239 | 2/1998 |
| WO | WO 98/35258 | 8/1998 |
| WO | WO 99/36825 | 7/1999 |
| WO | WO 00/67268 | 11/2000 |
| WO | WO 00/73839 A1 | 12/2000 |
| WO | WO 01/42844 A2 | 6/2001 |
| WO | WO 01/45120 A2 | 6/2001 |
| WO | WO 01/84531 A1 | 11/2001 |

OTHER PUBLICATIONS

Lee, J.Y. et al., "A Characterization of the Thermal parameters of Thermally Driven Polysilicon Microbridge Actuators Using Electrical Impedance Analysis", *Sensors and Actuators*, May 1999, 75(1)(4), 86-92, XP004147068.

Noworolski, J.Mark. et al., "Process for In-Plane and Out-of-Plane Single-Crystal-Silicon thermal Microactuators", *Sensors and Actuators*, 1996, 55, 65-69.

Sinclair, M.J., "1D and 2D Scanning Mirrors Using Thermal Buckle-Beam Actuation", *Proceedings of the SPIE*, Dec. 2001, 4592(17), 307-314, XP 009019263.

Sinclair, M.J., "A High Force Low Area MEMS Thermal Actuator", *The 7th Intersociety Conference on Thermal and Thermomechanical Phenomena in Electronic Systems*, May 2000, 127-132, XP010510393.

Chang, C. et al., "Innovative Micromachined Microwave Switch with Very Low Insertion Loss", *Sensors and Actuators*, 2000, 71-75.

Chen, R.T. et al., "A Low Voltage Micromachined Optical Switch by Stress-Induced Bending", *Micro Electro Mechanical Systems*, 1999, 424-428, XP 010321766.

Hagelin, P.M. et al., "Optical Raster-Scanning Displays Based on Syrface-Micromachines Polysilicon Mirrors", *IEEE Journal of Selected Topics in Quantum Electronics*, Jan. 1999, 5(1), 67-74 XP000823390.

Miller, D.C. et al., "Micromachined, Flip-Chip Assembled, Actuatable Contacts for Use in High density Interconnection in Electronics Packaging", *Sensors and Actuators*, 2001, 89, 76-87.

Seki, T. et al, "Thermal Buckling Actuator for Micro Relays", *Transducers*, 1997, 1153-1156.

Sinclair, M. "A High Frequency Resonant Scanner Using Thermal Actuation", *Technical Digest, 15th International Conference on Micro Electro Mechanical Systems*, Jan. 2002, 698-701.

* cited by examiner

MICROELECTRICAL MECHANICAL STRUCTURE (MEMS) OPTICAL MODULATOR AND OPTICAL DISPLAY SYSTEM

CROSS-REFERENCE TO RELATED APPLICATIONS

This application is a continuation of U.S. application Ser. No. 09/702,585, filed Oct. 31, 2000, now U.S. Pat. No. 6,775,048, which is hereby incorporated by reference in its entirety. This application is also related to application entitled Microelectrical Mechanical Structure (MEMS) Optical Modulator and Optical Display System, U.S. application Ser. No. 10/873,770, filed on even date herewith, which is hereby incorporated by reference in its entirety.

FIELD OF THE INVENTION

The present invention relates to optical display systems and, in particular, to a display system that employs a microelectrical mechanical system (MEMS) optical modulator.

BACKGROUND AND SUMMARY OF THE INVENTION

Flat panel optical display systems, such as liquid crystal displays, are well known and widely used. Many such displays (e.g., liquid crystal displays) require polarized illumination light. Typically, polarization of illumination light greatly attenuates the light, thereby resulting in displays with decreased brightness, or require relatively expensive optical components. Moreover, such displays commonly have relatively low contrast ratios, which decreases image clarity and overall image quality. Furthermore, such displays typically require complex or difficult manufacturing processes.

To address such shortcomings, the present invention includes a microelectrical mechanical optical display system that employs microelectrical mechanical system (MEMS) actuators to modulate light. As is known in the art, MEMS actuators provide control of very small components that are formed on semiconductor substrates by conventional semiconductor (e.g., CMOS) fabrication processes. MEMS systems and actuators are sometimes referred to as micromachined systems-on-a-chip.

In one implementation, a MEMS optical display system according to the present invention includes an illumination source for providing illumination light, a collimating lens for receiving the illumination light and forming from it collimated illumination light, and a converging microlens array having an array of lenslets that converge the collimated illumination light. The converging microlens array directs the illumination light to a microelectrical mechanical system (MEMS) optical modulator.

The MEMS optical modulator includes, for example, a planar substrate through which multiple pixel apertures extend and multiple MEMS actuators that support and selectively position MEMS shutters over the apertures. A MEMS actuator and MEMS shutter, together with a corresponding aperture, correspond to a pixel. The light from the converging microlens array is focused through the apertures and is selectively modulated according to the positioning of the MEMS shutters by the MEMS actuators, thereby to impart image information on the illumination light. The light is then passed to a diffused transmissive display screen by a projection microlens array.

In alternative implementations, a MEMS optical device module can be formed with at least, for example, a converging microlens array, a MEMS optical modulator, and a projection microlens array. MEMS optical display systems according to the present invention can be formed from multiple such modules that are arranged in arrays and combined with light sources, collimating optics, and display screens.

A MEMS optical display system according to the present invention is operable without polarized illumination light, thereby eliminating the light attenuation or expense of the polarizing illumination light. In addition, light can be completely blocked or modulated by the opaque MEMS shutters, thereby providing display images with very high contrast ratios. Furthermore, such MEMS optical modulators can be manufactured by conventional CMOS circuit manufacturing processes.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

To assist with understanding the present invention, the general procedure for fabricating micromechanical devices using the MUMPs process is explained with reference to FIGS. 1–15.

The MUMPs process provides three-layers of conformal polysilicon that are etched to create a desired physical structure. The first layer, designated POLY 0, is coupled to a supporting wafer, and the second and third layers, POLY 1 and POLY 2, respectively, are mechanical layers that can be separated from underlying structure by the use of sacrificial layers that separate layers and are removed during the process.

The accompanying figures show a general process for building a micro-motor as provided by the MEMS Technology Applications Center, 3021 Cornwallis Road, Research Triangle Park, North Carolina.

Figures 1, 2:
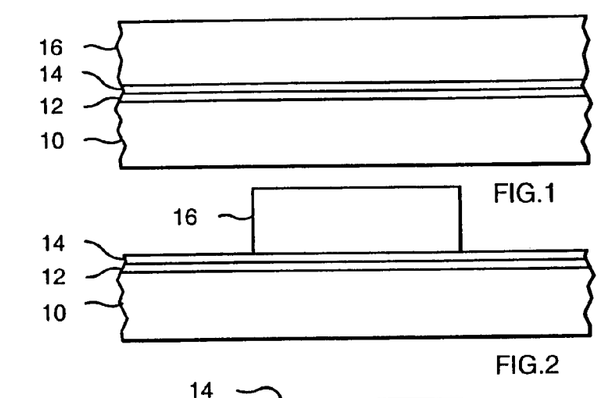
FIGS. 1–15 are cross-section views of a general multi-user MEMS process known in the prior art for fabricating microelectrical mechanical devices. Cross-hatching is omitted to improve clarity of the prior art structure and process depicted.

The MUMPs process begins with a 100 mm n-type silicon wafer 10. The wafer surface is heavily doped with phosphorus in a standard diffusion furnace using POCI 3 as the dopant source. This reduces charge feed-through to the silicon from electrostatic devices subsequently mounted on the wafer. Next, a 600 nm low-stress Low Pressure Chemical Vapor Deposition (LPCVD) silicon nitride layer 12 is deposited on the silicon as an electrical isolation layer. The silicon wafer and silicon nitride layer form a substrate.

Next, a 500 nm LPCVD polysilicon film—POLY 0.14—is deposited onto the substrate. The POLY 0 layer 14 is then patterned by photolithography; a process that includes coating the POLY 0 layer with a photoresist 16, exposing the photoresist with a mask (not shown) and developing the exposed photoresist to create the desired etch mask for subsequent pattern transfer into the POLY 0 layer (FIG. 2). After patterning the photoresist, the POLY 0 layer 14 is etched in a Reactive Ion Etch (RIE) system (FIG. 3).

Figures 3, 4, 5:
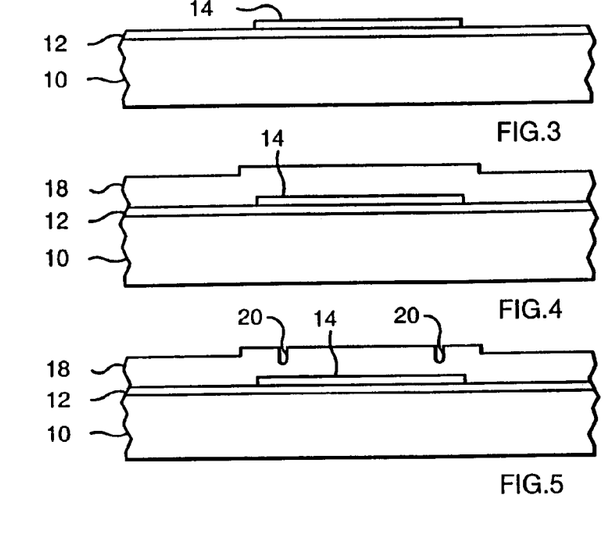

With reference to FIG. 4, a 2.0 μm phosphosilicate glass (PSG) sacrificial layer 18 is deposited by LPCVD onto the POLY 0 layer 14 and exposed portions of the nitride layer 102. This PSG layer, referred to herein as a First Oxide, is removed at the end of the process to free the first mechanical layer of polysilicon, POLY 1 (described below) from its underlying structure; namely, POLY 0 and the silicon nitride layers. This sacrificial layer is lithographically patterned with a DIMPLES mask to form dimples 20 in the First Oxide layer by RIE (FIG. 5) at a depth of 750 nm. The wafer is then patterned with a third mask layer, ANCHOR1, and etched (FIG. 6) to provide anchor holes 22 that extend through the First Oxide layer to the POLY 0 layer. The ANCHOR 1 holes will be filled in the next step by the POLY 1 layer 24.

After the ANCHOR1 etch, the first structural layer of polysilicon (POLY 1) 24 is deposited at a thickness of 2.0 μm. A thin 200 nm PSG layer 26 is then deposited over the POLY 1 layer 24 and the wafer is annealed (FIG. 7) to dope the POLY 1 layer with phosphorus from the PSG layers. The anneal also reduces stresses in the POLY 1 layer. The POLY 1 and PSG masking layers 24, 26 are lithographically patterned to form the structure of the POLY1 layer. After etching the POLY 1 layer (FIG. 8), the photoresist is stripped and the remaining oxide mask is removed by RIE.

Figures 6, 7, 8, 9:
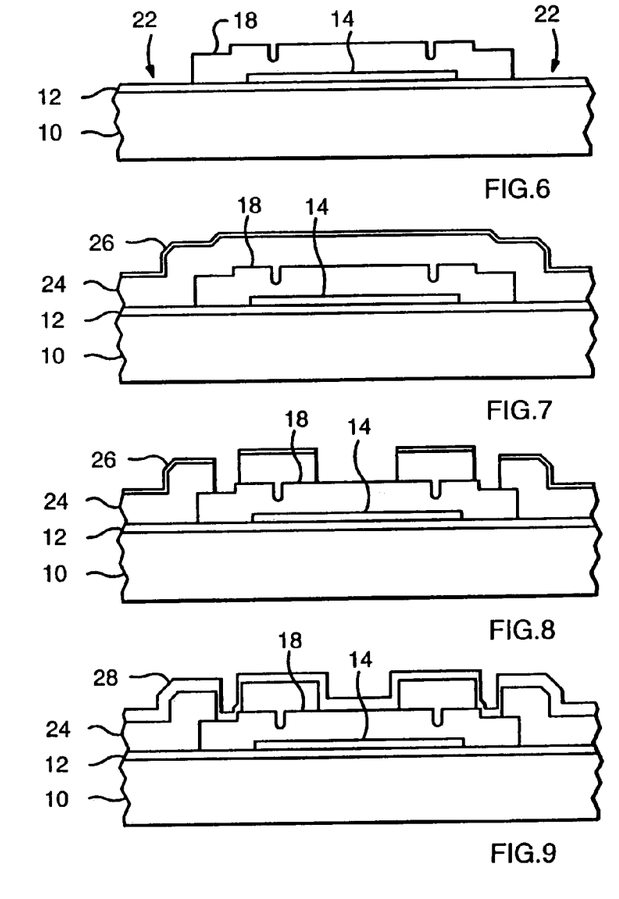

After the POLY 1 layer 24 is etched, a second PSG layer (hereinafter "Second Oxide") 28 is deposited (FIG. 9). The Second Oxide is patterned using two different etch masks with different objectives.

Figure 10:
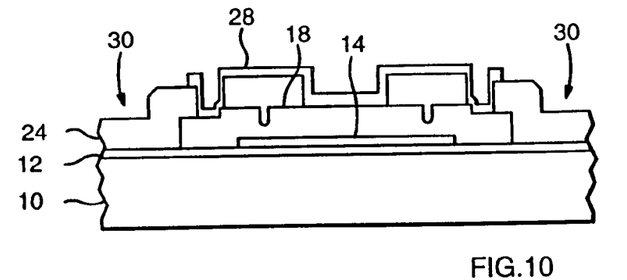

First, a POLY1_POLY2_VIA etch (depicted at 30) provides for etch holes in the Second Oxide down to the POLY 1 layer 24. This etch provide a mechanical and electrical connection between the POLY 1 layer and a subsequent POLY 2 layer. The POLY1_POLY2_VIA layer is lithographically patterned and etched by RIE (FIG. 10).

Figure 11:
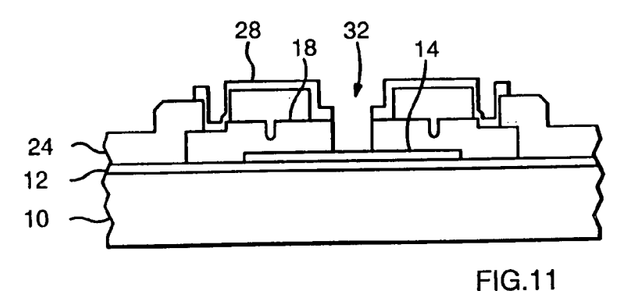
Figure 12:
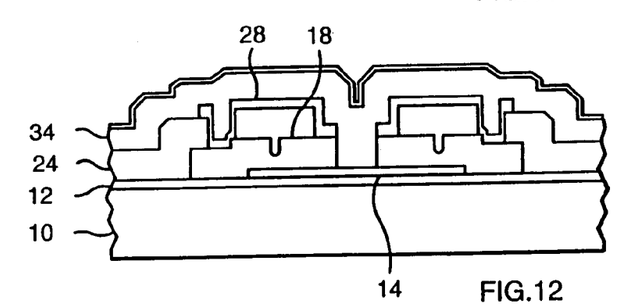

Second, an ANCHOR2 etch (depicted at 32) is provided to etch both the First and Second Oxide layers 18, 28 and POLY 1 layer 24 in one step (FIG. 11). For the ANCHOR2 etch, the Second Oxide layer is lithographically patterned and etched by RIE in the same way as the POLY1_POLY2_VIA etch. FIG. 11 shows the wafer cross section after both POLY1_POLY2_VIA and ANCHOR2 etches have been completed.

Figure 13:
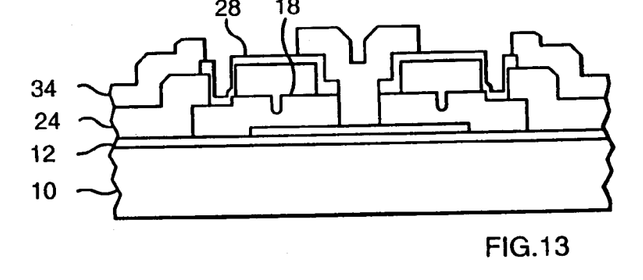

A second structural layer, POLY 2, 34 is then deposited at a thickness of 1.5 μm, followed by a deposition of 200 nm of PSG. The wafer is then annealed to dope the POLY 2 layer and reduce its residual film stresses. Next, the POLY 2 layer is lithographically patterned with a seventh mask and the PSG and POLY 2 layers are etched by RIE. The photoresist can then be stripped and the masking oxide is removed (FIG. 13).

Figure 14:
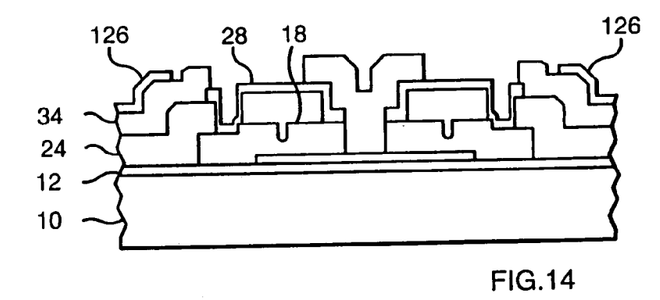

The final deposited layer in the MUMPs process is a 0.5 μm metal layer 36 that provides for probing, bonding, electrical routing and highly reflective mirror surfaces. The wafer is patterned lithographically with the eighth mask and the metal is deposited and patterned using a lift-off technique. The final, unreleased exemplary structure is shown in FIG. 14.

Figure 15:
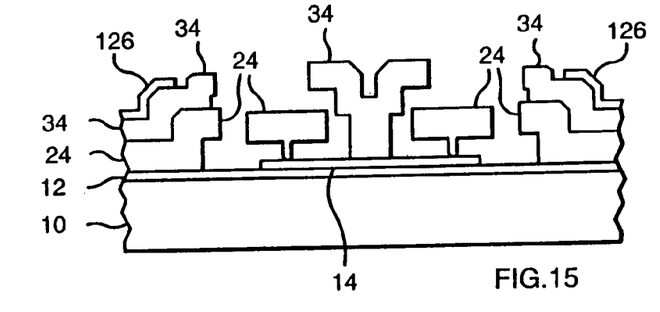

Lastly, the wafers undergo sacrificial release and test using known methods. FIG. 15 shows the device after the sacrificial oxides have been released.

In preferred embodiments, the device of the present invention is fabricated by the MUMPs process in accordance with the steps described above. However, the device of the present invention does not employ the specific masks shown in the general process of FIGS. 1–15, but rather employs masks specific to the structure of the present invention. Also, the steps described above for the MUMPs process may change as dictated by the MEMS Technology Applications Center. The fabrication process is not a part of the present invention and is only one of several processes that can be used to make the present invention.

Figure 16:
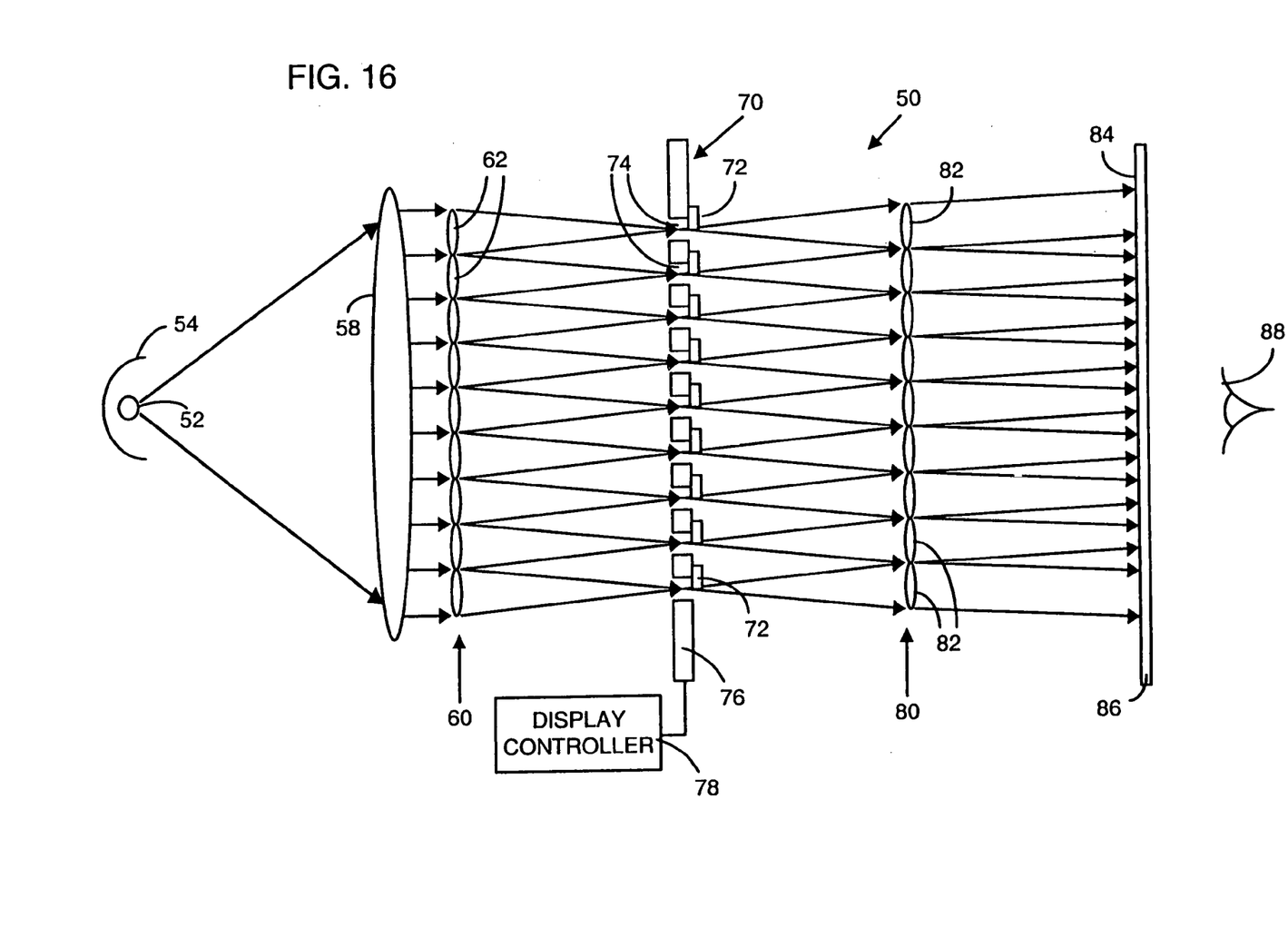
FIG. 16 is a diagrammatic side view of one implementation of a microelectrical mechanical (MEMS) optical display system according to the present invention.

FIG. 16 is a diagrammatic side view of a microelectrical mechanical structure (MEMS) optical display system 50 according to the present invention. Display system 50 includes a light source 52 and reflector 54 that direct illumination light to a collimator lens 58. A converging microlens array 60 having a two-dimensional array of lenslets 62 (only one dimension shown) receives the collimated light and focuses it toward a microelectrical mechanical structure (MEMS) optical modulator 70. Microlens array 60 could be formed as a molded array of plastic lenses or an array of holographic lenses, also referred to as hololenses, or may be an assembled array of conventional glass lenses.

MEMS optical modulator 70 has a two-dimensional array of microelectrical mechanical structure (MEMS) shutters 72 that are positioned adjacent corresponding apertures 74 through a microelectrical mechanical structure (MEMS) substrate 76, as described below in greater detail. Each MEMS shutter 72 corresponds to a picture element or pixel and is separately controllable by a display controller 78 to block or pass illumination light according to an image control signal (not shown), thereby to form a display image. For example, each MEMS shutter 72 could occlude its aperture 74 in inverse proportion to the brightness of the corresponding pixel for a given pixel period, or each MEMS shutter 72 could occlude its aperture 74 for an occlusion period that is inversely proportional to the brightness of the corresponding pixel.

A projection microlens array 80 having a two-dimensional array of lenslets 82 (only one dimension shown) receives the display image light and projects it toward a rear surface 84 of a transmissive display screen 86 for viewing by an observer 88. Projection microlens array 80 may be of a construction analogous to microlens array 60, and could be identical to it to minimize manufacturing tooling costs. Alternatively, projection microlens array 80 could enlarge or reduce the optical field so that it provides a desired image size on transmissive display screen 86, and display screen 86 can be a diffused display screen.

MEMS optical display system 50 has a number of advantages over commonly available liquid crystal displays. For example, MEMS optical modulator 70 does not require that the illumination light be polarized, in contrast to the typical operation of liquid crystal cells. This eliminates the expense and light attenuation that typically accompanies polarization. Moreover, MEMS optical modulator 70 can pass unmodulated light with virtually no attenuation, whereas typical liquid crystal cells significantly attenuate light. Similarly, MEMS optical modulator 70 can provide much higher contrast ratios than liquid crystal cells because MEMS shutters 72 are opaque and can provide complete modulation of the light. Finally, MEMS optical modulator 70 can be manufactured by conventional CMOS circuit techniques without requiring the complex processes typically required for liquid crystal displays.

In one implementation, for example, MEMS optical modulator 70 could include a 200×200 array of MEMS shutters 72 for controlling light passing through a corresponding 200×200 array of apertures. 74. In this implementation, for example, converging microlens array 60 could include 200×200 lenslets 62 that each have a focal length of about 1 mm, and apertures 74 may be positioned in a right, regular array with separations of about 50 µm, between them. MEMS optical modulator 70 in such an implementation could have dimensions of 1 cm×1 cm and thickness of substrate 76 of about 200 µm. With lenslets 82 of projection microlens array 80 providing magnification of about 2.5, display screen 86 could have dimensions of about 2.5 cm×2.5 cm, or about 1 inch×1 inch.

Figure 17:
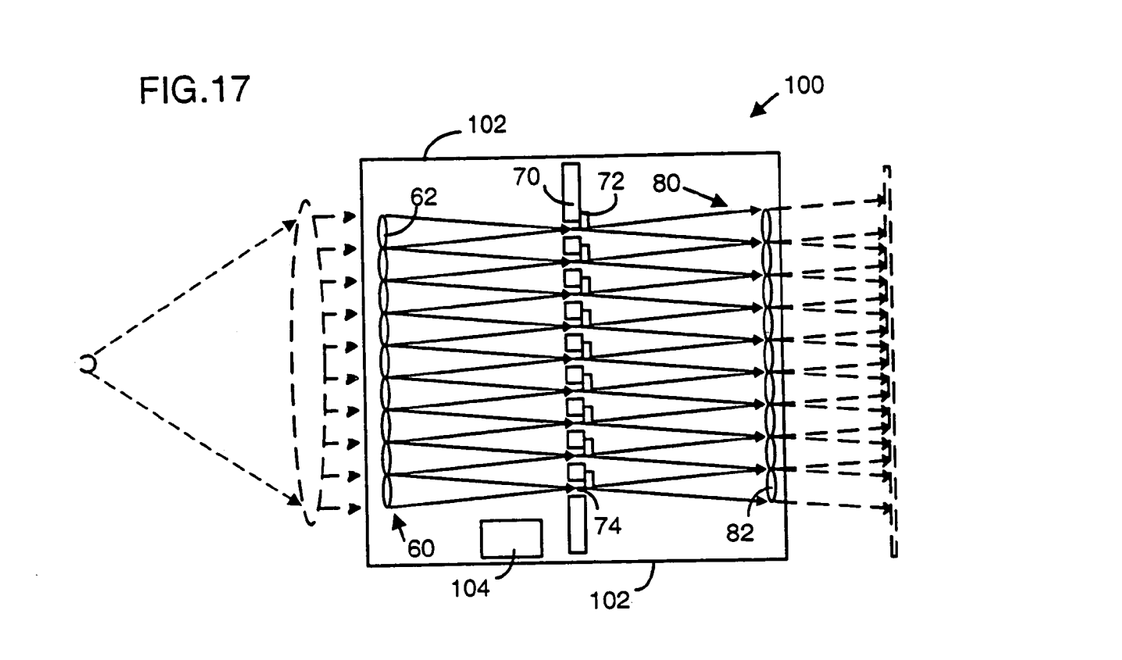
FIG. 17 is a diagrammatic side view of a MEMS optical device module.

FIG. 17 is a diagrammatic side view of a MEMS optical device module 100 having converging microlens array 60 with a two-dimensional array of lenslets 62 (only-one dimension shown), MEMS optical modulator 70, and projection microlens array 80 with a two-dimensional array of lenslets 82 (only one dimension shown). MEMS optical device module 100 is shown in relation to an illumination source, collimating lens and display screen (shown in dashed lines) to illustrate an exemplary display application or use of module 100.

MEMS optical device module 100 includes a mounting structure (e.g., a frame or housing) 102 that contains or encompasses converging microlens array 60, MEMS optical modulator 70, and projection microlens array 80. Mounting structure 102 allows MEMS optical device module 100 to fit together with other such modules, either in a close packed arrangement or in secure engagement with each other. An electrical connection 104 (e.g., a plug, socket, lead, etc.) allows a display controller (not shown) to be connected to MEMS optical modulator 70 to provide display control signals for controlling MEMS shutters 72. It will be appreciated that in other implementations, a MEMS optical device module of this invention could include any of an illumination source, collimating optics and a display screen.

Figure 18:
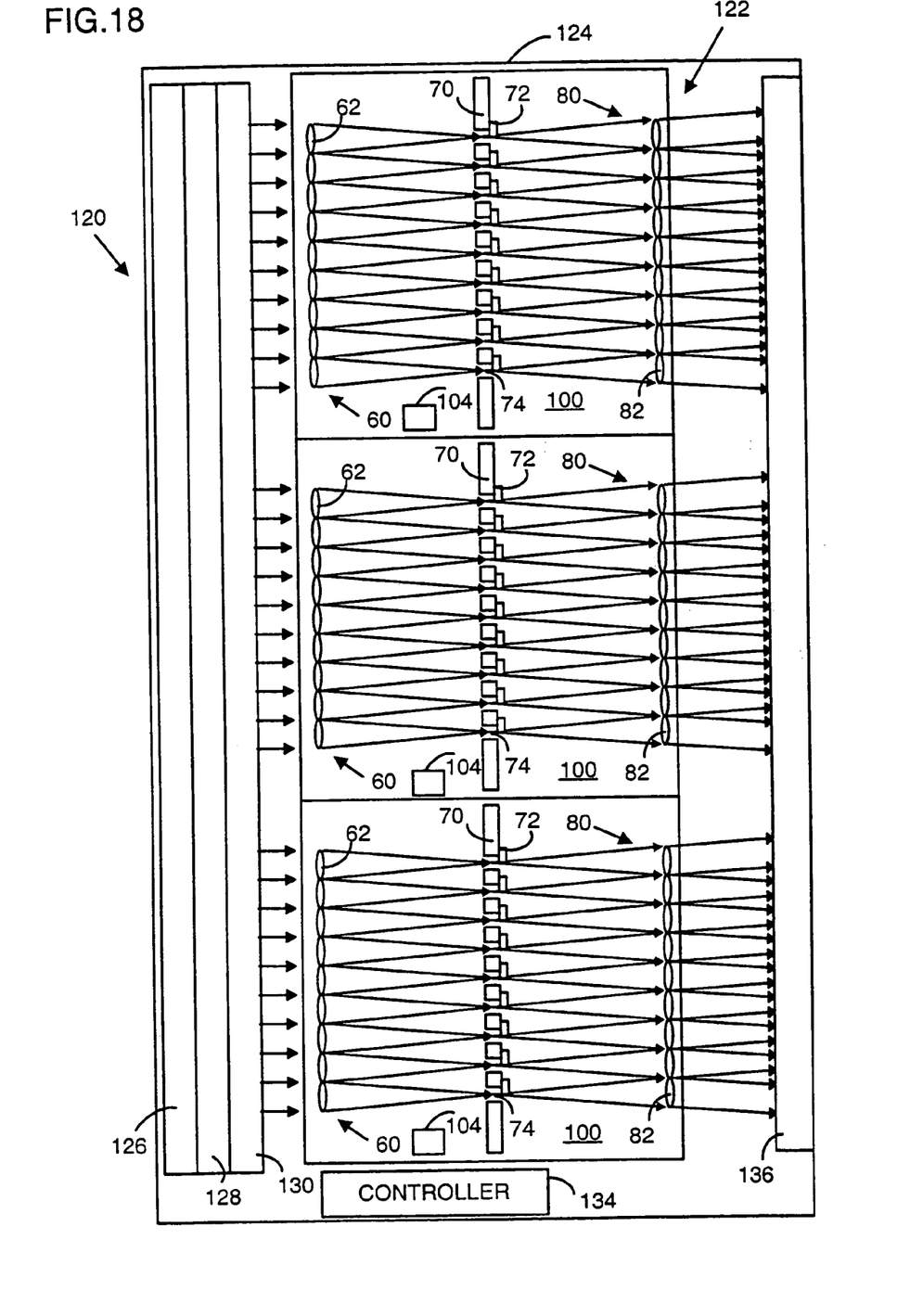
FIG. 18 is a diagrammatic side view of a modular optical device that includes an array of multiple MEMS optical device modules of FIG. 17.

FIG. 18 is a diagrammatic side view of a MEMS optical display system 120 that includes a one- or two-dimensional array 122 (only one dimension shown) of multiple MEMS optical device modules 100. In one implementation, all of MEMS optical device modules 100 are identical. A modular display housing 124 supports and encloses array 122 of MEMS optical device modules 100.

Modular display housing 124 includes a light source 126, a reflector 128, and collimating optics 130 to provide collimated illumination to the multiple MEMS optical device modules 100. To support a thin flat panel form factor, light source 126 and reflector 128 could be analogous to those used in laptop computer flat panel displays, and collimating optics 130 could be a generally flat microlens array or Fresnel lens.

An integrated display controller 134 is electrically coupled to electrical connections 104 of MEMS optical device modules 100 to provide integrated control of modules 100 as a single display. (The electrical couplings are not shown for purposes of clarity.) A transmissive, diffusive display screen 136 functions as an integral display screen for the MEMS optical device modules 100 of array 122.

In an exemplary implementation, each MEMS optical device module 100 provides a 200 pixel×200 pixel display over an area of 2.5 cm×2.5 cm. A MEMS optical display system 120 that includes a 6×8 array 122 of MEMS optical device modules 100 would provide a 1200 pixel×1600 pixel display over an area of 15 cm×20 cm.

For purposes of illustration, MEMS optical display system 50 and MEMS optical device modules 100 are each shown with a diagrammatic light source 52. In monochromatic (e.g., black and white) implementations, light source 52 could correspond to a single (e.g., nominally white) light source (e.g., lamp). In polychromatic implementations, light source 52 could include one or more separately controlled light sources that cooperate to provide polychromatic or full-color images.

Figure 19:
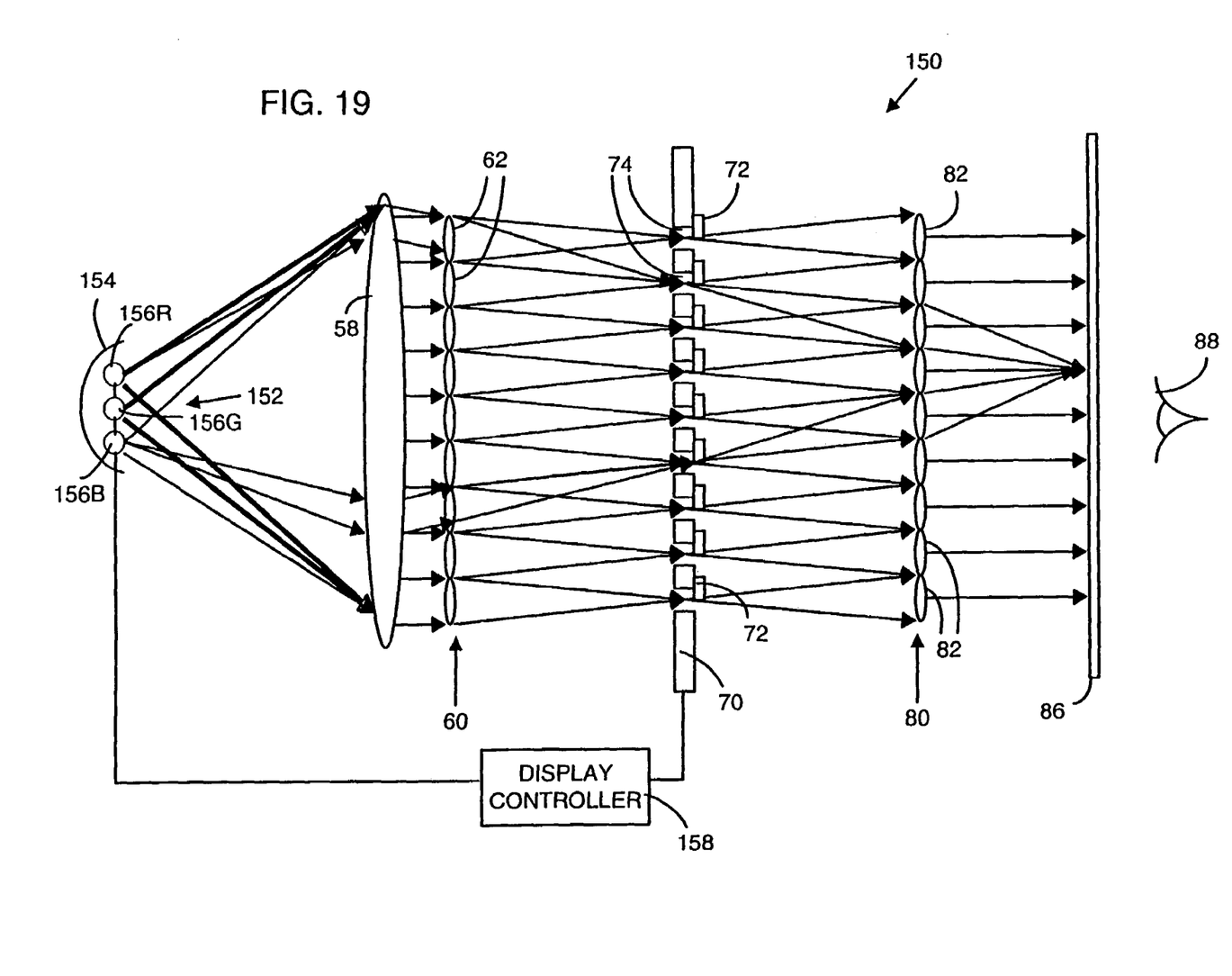
FIG. 19 another implementation of a microelectrical mechanical (MEMS) optical display system according to the present invention.

FIG. 19 is a diagrammatic side view of a microelectrical mechanical structure (MEMS) optical display system 150 showing one implementation of a polychromatic illumination source 152 and an associated reflector 154. Components of MEMS optical display system 150 that are generally the same as those of display system 50 are indicated by the same reference numerals.

Illumination source 152 includes multiple (e.g., three) color component light sources (e.g., lamps) 156R, 156G, and 156B that are positioned. generally in a line and generate red, green, and blue light, respectively. A display controller 158 that separately controls MEMS shutters 72 also activates color component light sources 156R, 156G, and 156B separately. During times that it successively activates color component light sources 156R, 156G, and 156B, display controller 158 applies control signals to MEMS shutters 72 corresponding to red, green, and blue image components, thereby to form color component images in a field-sequential manner.

For example, color component images that are generated at a rate of 180 Hz can provide an image frame rate of 60 Hz. In one exemplary implementation, a display of 200×200 multi-color pixels could employ microlens arrays 60 and 70 with 204×204 arrays of lenslets 62 and 72, respectively, to compensate for different optical paths taken by different color components of light forming the display gamut. As an alternative implementation, it will be appreciated that multiple successive colors of illumination could be obtained by a spinning color wheel and a white light source, as is known in the art.

Figure 20:
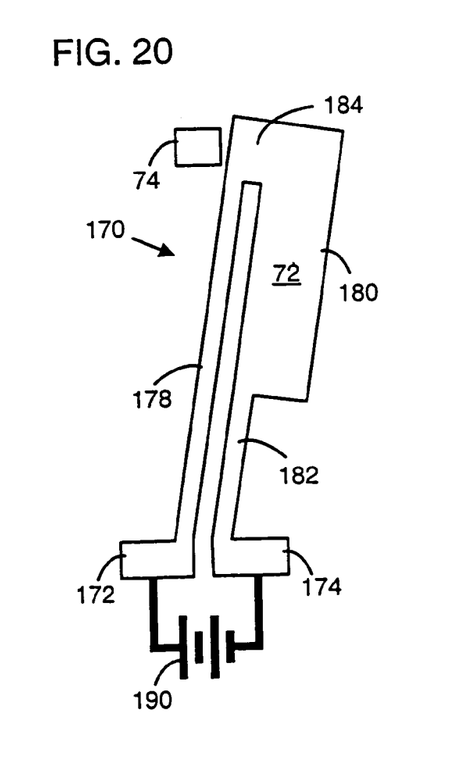
FIGS. 20 and 21 are front views of an exemplary MEMS actuator in respective activated and relaxed states for a controlling MEMS shutter.
Figure 21:
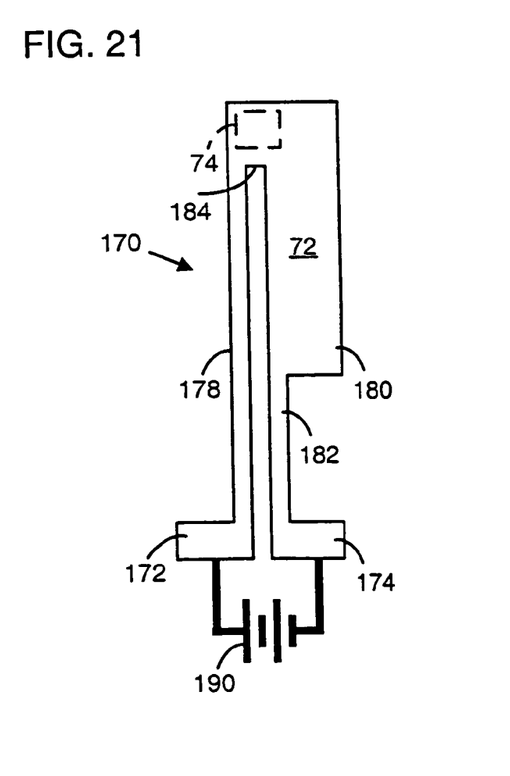

FIGS. 20 and 21 are front views of an exemplary MEMS actuator 170 in respective activated and relaxed states for controlling MEMS shutter 72. In this exemplary implementation, MEMS shutter 72 is maintained over its associated aperture 74 extending through MEMS substrate 76 when MEMS actuator 170 is in a relaxed state. MEMS shutter 72 is moved to not obstruct its associated aperture 74 when MEMS actuator 170 is in an activated state. MEMS actuator 170 is one of a variety of MEMS actuators that could be used to control MEMS shutter 72.

MEMS actuator 170 is an implementation of a thermal actuator, sometimes called a heatuator, that functions as a pseudo-bimorph. Actuator 170 includes a pair of structural anchors 172 and 174 that are secured to a substrate (e.g., substrate 10 or nitride layer 12, not shown). A narrow semiconductor (e.g., polysilicon) arm 178 is secured to anchor 172, and a wide semiconductor (e.g., polysilicon) arm 180 is secured to anchor 174 through a narrow extension 182. Arms 178 and 180 are coupled together by a cross member 184. Except for attachments to anchors 172 and 174, arms 178 and 180, extension 182, and cross member 184 are released from the substrate.

The components of actuator 170 have electrically semi-conductive and positive coefficient of thermal expansion properties. For example, actuator 170 is formed of silicon. Actuator 170 is activated when an electrical current is passed from a current source 190, such as a pixel control signal source, through arms 178 and 180. The applied current induces ohmic or Joule heating of arms 178 and 180, causing them to expand longitudinally due to the positive temperature coefficient of expansion of silicon. The smaller size of arm 178 causes it to expand more than arm 180.

Actuator 170 utilizes differential thermal expansion of different-sized arms 178 and 180 to produce a pseudo-bimorph that deflects in an arc parallel to the substrate. With actuator 170 in its relaxed state, as shown in FIG. 21, MEMS shutter 72 is positioned over aperture 74 and blocks light that is directed through it. With actuator 170 in its activated state, as shown in FIG. 20, MEMS shutter 72 is moved to allow light to pass through aperture 74.

Figure 22:
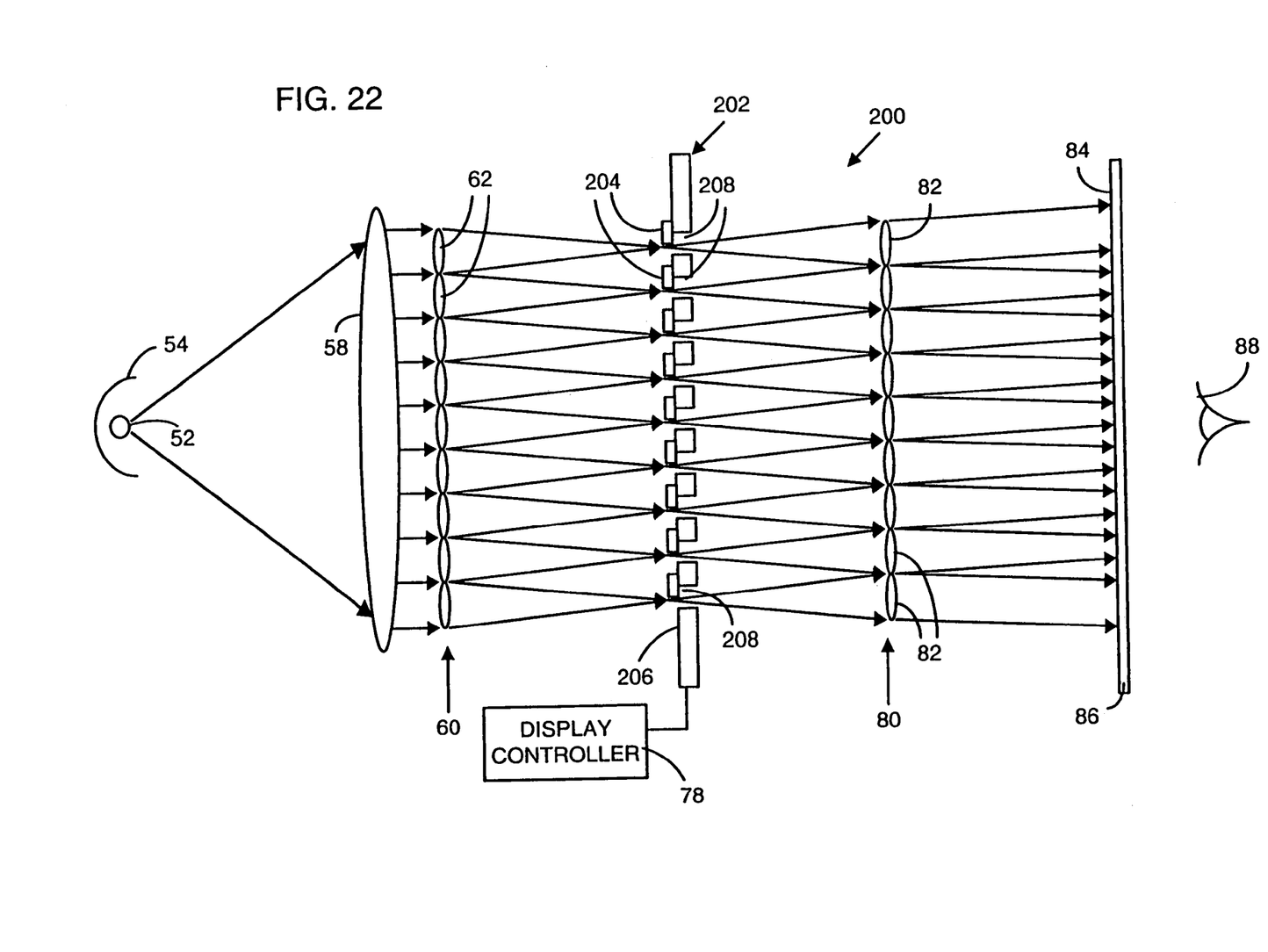
FIG. 22 yet another implementation of a microelectrical mechanical (MEMS) optical display system according to the present invention.

FIG. 22 is a diagrammatic side view of a microelectrical mechanical structure (MEMS) optical display system 200 that is the same as MEMS optical display system 50, except that a microelectrical mechanical structure (MEMS) optical modulator 202 includes a two-dimensional array of microelectrical mechanical structure (MEMS) shutters 204 positioned on a light-receiving side 206 adjacent apertures 208. MEMS shutters 204 may be controlled by MEMS actuators (not shown) that move within a-plane parallel to optical modulator 202, as described above with reference to FIGS. 20 and 21.

In other implementations, MEMS shutters 72, and 204 of MEMS optical modulators 70 and 202 could be controlled by MEMS actuators that move shutters 72 and 204 in planes that are transverse (e.g., perpendicular) to modulators 70 and 202, respectively. In such implementations, shutters 72 and 204 would have light-blocking positions at about the focal points of lenslets 62. Shutters 72 and 204 would have generally light-transmitting positions that are generally distant from the focal points, but still within the optical paths of the light.

Figure 23:
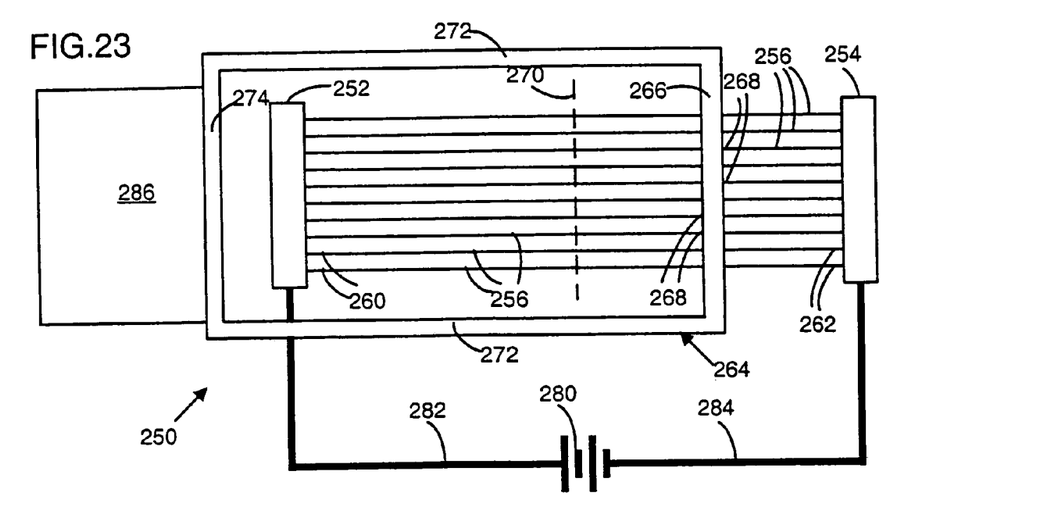
FIG. 23 is a diagrammatic plan view of a microelectrical mechanical out-of-plane thermal buckle-beam actuator.

FIG. 23 is a diagrammatic plan view of a microelectrical mechanical out-of-plane thermal buckle-beam actuator 250 capable of providing transverse-plane movement of shutters 72 and 204, as described above. Actuator 250 includes a pair of structural anchors 252 and 254 that are secured to a substrate (e.g., substrate 10 or nitride layer 12, not shown) and one or more thermal buckle beams 256 (multiple shown) that are secured at their base ends 260 and 262 to anchors 252 and 254, respectively. Buckle beams 256 are substantially the same and extend substantially parallel to and spaced-apart from the substrate and are released from it other than at anchors 252 and 254.

Figure 24:
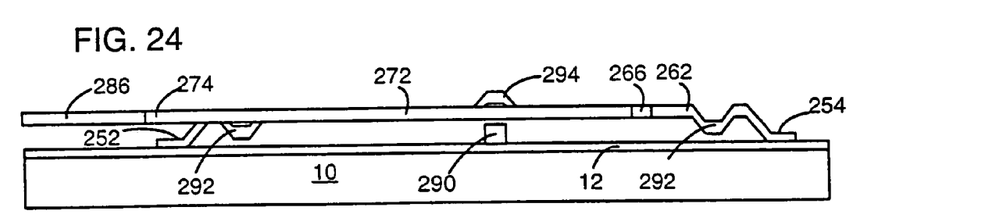
FIG. 24 is a diagrammatic side view of the actuator of FIG. 23 in a relaxed state.

A pivot frame 264 includes a frame base 266 that is secured to buckle beams 256 at coupling points 268 that in one implementation are positioned between buckle beam-midpoints (indicated by dashed line 270) and one of anchors 252 and 254 (e.g., anchor 254). Pivot frame 264 further includes at least one pivot arm 272 (two shown) that is coupled to frame base 266 at one end and extends to a free end 274 that pivots out-of-plane when actuator 250 is activated. Pivot frame 264 is released and free to move, other than where frame base 266 is secured to coupling points 268. FIG. 24 is a diagrammatic side view of actuator 250 in a relaxed state illustrating pivot frame 264 as being generally parallel to or co-planar with buckle beams 256.

Figure 25:
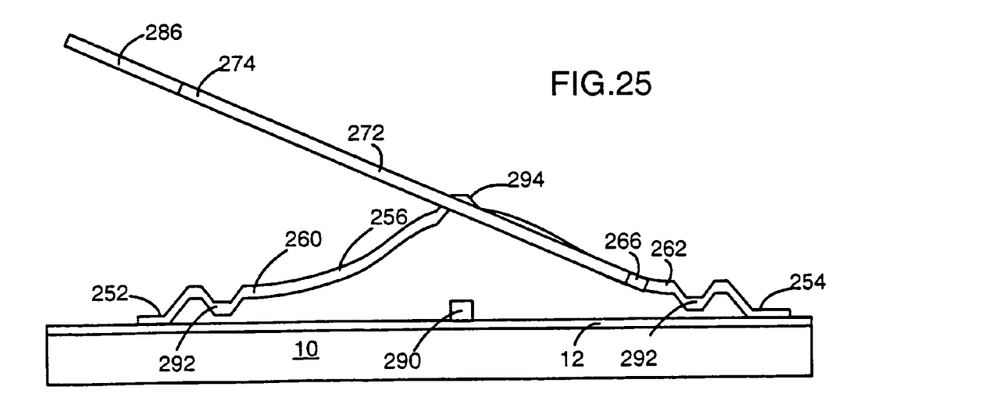
FIG. 25 is a diagrammatic side view of the actuator of FIG. 23 in an activated state.

Structural anchors 252 and 254 and buckle beams 256 have electrically semi-conductive and positive coefficient of thermal expansion. properties. For example, buckle beams 256 are formed of silicon. Actuator 250 is activated when an electrical current is passed from a current source 280 through buckle beams 256 via electrically conductive couplings 282 and 284 and structural anchors 252 and 254, respectively. The applied current induces ohmic or Joule heating of buckle beams 256, thereby causing them to expand longitudinally due to the positive temperature coefficient of expansion of silicon. With anchors 252 and 254 constraining base ends 260 and 262 of buckle beams 256, the expanding buckle beams 256 ultimately buckle away from the substrate. In one implementation, buckle beams 256 are formed to have a widened aspect ratio, with widths (parallel to the substrate) greater than the thicknesses (perpendicular to the substrate), to provide a bias or predisposition for buckling away from the substrate, rather than parallel to it. FIG. 25 is a diagrammatic side view of actuator 250 in an activated state illustrating the out-of-plane buckling of buckle beams 256.

The buckling of buckle beams 256 away from the substrate in the active state of actuator 250 causes free end 274 of pivot frame 264 to pivot away from the substrate. Pivot frame 264 rotates about frame base 266, which is also raised away from the substrate by buckle beams 256. As a result, free end 274 moves and exerts a pivoting or rotational force outward away from the substrate. When the activation current ceases, buckle beams 256 cool and contract, which causes free end 274 of pivot frame 264 to return to its initial position with a force equal to the actuation force, but in opposite rotational and translational directions. Such rotational deflections of pivot frame 264 may be used in a variety of applications, including providing out-of-plane deployment of other micro-mechanical structures, such as those used in micro-optical devices. In-the implementation illustrated in FIGS. 23–25, for example, a shutter 286 is secured to free end 274 and pivots with pivot frame 264 to selectively deflect light according to whether actuator 250 is in its relaxed or activated state.

FIG. 24 shows buckle beam 256 in a relaxed state extending over a spacing pad 290 that is secured to and extends from substrate 10 (e.g., the nitride layer 12) near the middle of buckle beam 256. FIG. 25 shows buckle beam 256 in an activated state. For example, spacing pad 290 may be formed of a P0 layer with a thickness of 0.5 µm, and buckle beam 256 may be formed of a different (released) layer. Spacing pad 290 forces a small (e.g., 0.5 µm) hump or deflection 294 in each of buckle beams 256 due to the conformal nature of the fabrication. Also, a dimple 292 is formed near each end of buckle beam 256. Dimples 292 may be formed as a protrusion or dimple extending from a bottom surface of buckle beam 256 or as a recess into its top surface, or both, as illustrated. In a MUMPs implementation, for example, dimple 292 may be formed as is a 0.5 µm depression in the 2 µm poly1 layer and does not touch the substrate.

Spacing pad 290 and dimples 292 cause buckle beams 256 to buckle away from the substrate and reduce the stiction between buckle beams 256 and the substrate (e.g., the nitride layer 12). It will be appreciated that for the multiple buckle beams 256 in a typical actuator 250, a, separate spacing pad 290 could be formed for each buckle beam 256 or spacing pad 290 could be formed as a single continuous pad that extends beneath all the buckle beams 256. Spacing pad 290 and dimples 292, either individually or together, could be used alone or with a widened aspect ratio for buckle beams 256 to provide a bias or predisposition for them-to buckle away from the substrate.

As described above, some implementations employ thermal MEMS actuators. Some thermal MEMS actuators can require significant power when activated (e.g., 10 mA), so that current requirements for simultaneous operation of many such actuators can be excessive. It will be appreciated, therefore, that other MEMS actuators, including at least electrostatic actuators and thermal actuators with reduced power requirements, may be used in other implementations to reduce the overall system power requirements. In addition, applications described above refer primarily to optical display applications. It will be appreciated, however, that various aspects of the present invention, including MEMS optical modulators 70 and MEMS optical device modules 100, could be used in other light modulating applications, such as modulated scanners, detectors, etc. In such applications, MEMS optical modulators 70 and MEMS optical device modules 100, for example, could employ one-dimensional arrays of optical elements.

In one implementation described above, MEMS substrate 76 of MEMS optical modulator 70 has a thickness of about 200 μm. In mounting or supporting MEMS optical modulator 70 by its edges, such a thickness provides MEMS optical modulator 70 with adequate structural rigidity. With apertures 74 having dimensions across them of about 20 μm, lenslets 62 of converging microlens array 60 can require a relatively large depth of focus. To avoid such a large depth of focus, an alternative implementation of a MEMS optical modulator, such as MEMS optical modulator 202 in FIG. 22, could employ reflective pads, rather than apertures, to selectively reflect illumination light from the reflective pads to a display screen, scanner, sensors, etc.

Parts of the description of the preferred embodiment refer to steps of the MUMPs fabrication process described above. However, as stated, MUMPs is a general fabrication process that accommodates a wide range of MEMS device designs. Consequently, a fabrication process that is specifically designed for the present invention will likely include different steps, additional steps, different dimensions and thickness, and different materials. Such specific fabrication processes are within the ken of persons skilled in the art of photolithographic processes and are not a part of the present invention.

In view of the many possible embodiments to which the principles of our invention may be applied, it should be recognized that the detailed embodiments are illustrative only and should not be taken as limiting the scope of our invention. Rather, I claim as my invention all such embodiments as may come within the scope and spirit of the following claims and equivalents thereto.

I claim:

1. A microelectrical mechanical multi-pixel optical modulator, comprising:
   a planar substrate with plural pixel regions; and
   plural microelectrical mechanical actuators that support and selectively position plural microelectrical mechanical shutters to selectively modulate light for illuminating a display directed at the pixel regions;
   wherein the actuators are thermal actuators and wherein each actuator comprises a beam adapted to exert a rotational force to position a respective shutter.

2. The optical modulator of claim 1 in which each pixel region includes an aperture that extends through the planar substrate.

3. The optical modulator of claim 1 in which each pixel region includes a reflector on the planar substrate.

4. The optical modulator of claim 1 in which the actuators provide selective positioning of the shutters generally in a plane that is parallel to the substrate.

5. The optical modulator of claim 1 in which the actuators provide selective positioning of the shutters generally in a plane that is transverse to the substrate.

6. A microelectrical mechanical optical display, comprising:
   an illumination source that provides illumination light to illuminate a display;
   a collimating lens that receives the illumination light and forming from it collimated illumination light;
   plural microelectrical mechanical optical modules that each include a converging microlens array having an array of plural lenslets that converge the illumination light, a microelectrical mechanical optical modulator including a planar substrate with plural pixel regions and plural microelectrical mechanical actuators that support and selectively position plural microelectrical mechanical shutters over the pixel regions to selectively modulate the illumination light from the converging microlens array, a projection microlens array having an array of plural lenslets and being positioned to receive modulated light from the optical modulator to project the modulated light, and a mounting structure configured to fit together with other such mounting structures, wherein the plural optical modules are arranged in an array, wherein the actuators are thermal actuators, and wherein each actuator comprises a beam adapted to exert a rotational force to position a respective shutter; and
   a display screen that receives the illumination light passing the microelectrical mechanical optical modulator.

7. The optical display of claim 6 in which the illumination source provides illumination light for all of the optical modules.

8. The optical display of claim 6 in which each pixel region includes an aperture that extends through the planar substrate.

9. The optical display of claim 6 in which the actuators provide selective positioning of the shutters generally in a plane that is parallel to the substrate.

10. The optical display of claim 6 in which the actuators provide selective positioning of the shutters generally in a plane that is transverse to the substrate.

11. A microelectrical mechanical optical module, comprising: converging microlens array means for converging illumination light;
   microelectrical mechanical optical modulator means for selectively modulating light for illuminating a display from the converging microlens array including a planar substrate with plural pixel regions and plural microelectrical mechanical thermal buckle-beam actuators that support and selectively position plural microelectrical mechanical shutters over the pixel regions, wherein each actuator comprises a beam adapted to exert a rotational force to position a respective shutter; and projection microlens array means positioned to receive modulated light from the optical modulator for projecting the modulated light.

12. The optical module of claim 11 in which the converging microlens array means includes an array of plural lenslets.

13. The optical module of claim 11 in which the projection microlens array means includes an array of plural lenslets.

* * * * *